(12) United States Patent
Poleshuk et al.

(10) Patent No.: US 6,227,227 B1
(45) Date of Patent: May 8, 2001

(54) SINGLE METER BLENDING FUEL DISPENSING SYSTEM

(75) Inventors: Edward S. Poleshuk; Joseph D. Long, both of Greensboro, NC (US)

(73) Assignee: Masconi Commerce Systems Inc., Greensboro, NC (US)

(*) Notice: Subject to any disclaimer, the term of this patent is extended or adjusted under 35 U.S.C. 154(b) by 0 days.

(21) Appl. No.: 09/336,501

(22) Filed: Jun. 18, 1999

(51) Int. Cl.$^7$ .................................................. G05D 11/13
(52) U.S. Cl. .................... 137/98; 137/101.19; 700/239; 222/71; 222/1
(58) Field of Search ................................. 137/98, 101.19, 137/101.21; 123/515, 575; 700/239, 240; 222/71, 134, 1

(56) References Cited

U.S. PATENT DOCUMENTS

| | | |
|---|---|---|
| 3,751,644 | 8/1973 | Mayer . |
| 3,864,095 | 2/1975 | Sinclair et al. . |
| 3,999,959 | 12/1976 | Bajek . |
| 4,223,807 | 9/1980 | Caswell et al. . |
| 4,404,984 | 9/1983 | Jones . |
| 4,876,653 | 10/1989 | McSpadden et al. . |
| 4,963,745 | 10/1990 | Maggard . |
| 4,978,029 | 12/1990 | Furrow et al. . |
| 5,018,645 | 5/1991 | Zinsmeyer . |
| 5,029,100 * | 7/1991 | Young et al. .......................... 364/479 |
| 5,038,971 | 8/1991 | Gayer et al. . |
| 5,125,533 | 6/1992 | Gayer et al. . |
| 5,139,045 | 8/1992 | Ensign . |
| 5,203,384 | 4/1993 | Hansen . |
| 5,223,714 | 6/1993 | Maggard . |
| 5,225,679 | 7/1993 | Clarke et al. . |
| 5,257,720 | 11/1993 | Wule et al. . |
| 5,412,581 | 5/1995 | Tackett . |
| 5,447,062 | 9/1995 | Kopl et al. . |
| 5,469,830 * | 11/1995 | Gonalez ................................ 123/515 |
| 5,569,922 | 10/1996 | Clarke . |
| 5,606,130 | 2/1997 | Sinha et al. . |
| 5,630,528 | 5/1997 | Nanaji . |
| 5,706,871 | 1/1998 | Andersson et al. . |
| 5,921,263 | 7/1999 | Negley, III . |
| 5,956,254 * | 9/1999 | Collins ................................... 222/1 X |
| 5,979,705 | 7/1999 | Kaehler et al. . |
| 6,006,775 * | 12/1999 | Negley, III .................. 137/101.19 X |
| 6,065,638 * | 5/2000 | Terranova et al. ........................ 222/1 |

FOREIGN PATENT DOCUMENTS

| | | |
|---|---|---|
| 0 572 621 B1 | 12/1992 | (EP) . |
| 2 333 508A | 7/1999 | (GB) . |

* cited by examiner

*Primary Examiner*—Kevin Lee
(74) *Attorney, Agent, or Firm*—Withrow & Terranova PLLC

(57) ABSTRACT

A single meter blending fuel dispensing system utilizing a pair of proportional flow control valves each having a pressure transducer positioned aft of the valve flow control mechanism. A computer controller is used to program a desired fuel mixture by varying the pressure for each flow control valve. A pressure decrease in one valve produces a corresponding pressure increase in the other valve. A third pressure transducer can be situated downstream of the valves and is set such that the pressure it receives cannot exceed that of the two valve pressures. Flow meters can be substituted for the pressure sensors. A calibration method for calibrating the positive displacement meter is also disclosed. At installation the positive displacement meter is at its most accurate and is synchronized with the less accurate pressure sensors or flow meters. As time passes and the positive displacement meter wears it can be re-calibrated using the baseline data and the pressure sensors or flow meters which are not subject to mechanical wear.

15 Claims, 3 Drawing Sheets

SINGLE METER BLENDING FUEL DISPENSING SYSTEM

TECHNICAL FIELD

The present invention relates to a single meter blending fuel dispensing system. More particularly, the present invention relates to a single meter blending fuel dispensing system utilizing a pair of proportional flow control valves with corresponding pressure sensors or flow meters to create an exact blend of high and low octane fuel.

BACKGROUND ART

It is now commonplace for fuel dispensing systems to blend different octane grade fuels into an intermediate grade for consumption. Previously, a fuel dispenser was connected to as many underground tanks as grades of fuel offered from a given dispenser. That is, there was a one to one correspondence between the octanes offered and the number of underground tanks. Each nozzle simply drew from a tank of a particular octane rating. This required expensive installation and maintenance of several underground tanks.

Currently, however, gas stations can provide many grades of fuel from only two underground tanks, a high and a low octane tank, by blending the fuels of each into the desired intermediate grade. This proves much more economical and efficient due to the reduction in the number of underground tanks.

Fuel blending is a well-known concept as evidenced by the representative prior art patent references cited below. The techniques and mechanisms used to achieve fuel blending, however, are quite variable.

U.S. Pat. No. 4,404,984 issued to Jones entitled *"Gas-Liquid Mixing Metering System"* describes a blender which differentially senses liquid pressure and gas pressure and provides adjustment means for a valve in order to increase or decrease pressure based on current requirements.

U.S. Pat. No. 5,139,045 issued to Ensign entitled *"System for Dispensing a Fuel Mixture"* describes a system for blending two different fuel grades to produce a third intermediate fuel grade.

U.S. Pat. No. 5,125,533 issued to Gayer et al. entitled *"Variable Blending Dispenser"* describes a variable valve system using flow-meters to calibrate and correct errors in a fuel blending system.

U.S. Pat. No. 3,999,959 issued to Bajek entitled *"Motor fuel Blending Control System"* describes a system for mixing two gasoline streams having dissimilar octane ratings.

The present invention is advantageously distinguishable from each of the above references in the mechanisms and methods it uses to achieve fuel blending.

DISCLOSURE OF THE INVENTION

The preferred embodiment of the present invention comprises a single meter blending fuel dispensing system utilizing a pair of proportional flow control valves each having a pressure transducer positioned aft of the valve flow control mechanism. A computer controller is used to program a desired fuel mixture by varying the pressure for each flow control valve. A pressure decrease or increase in either of the valves is detected by the controller which will make adjustments to the valve flow control mechanisms in order to maintain the desired blend ratio. A third pressure transducer can be situated downstream of the valves and is set such that the pressure it receives cannot exceed that of the two valve pressures.

A second embodiment of the present invention substitutes flow meters for the pressure sensors in order to determine the amount of fuel being dispensed by the different flow paths.

The system of the present invention also provides a means for calibrating the positive displacement meter. The positive displacement meter is the highly accurate meter required to ensure that a customer receives the exact amount of fuel he is paying for. Government regulations require periodic, typically annual, testing of each fuel dispenser's positive displacement meter since it is subject to mechanical wear. At installation, however, the positive displacement meter is at its most accurate. It is synchronized with the less accurate pressure sensors or flow meters and the data is stored. As time passes and the positive displacement meter wears, the wear can be compensated for by software using the baseline data and the pressure sensors or flow meters which are not subject to mechanical wear.

It is therefore an object of the present invention to provide a fuel blending system utilizing proportional flow control valves and corresponding pressure sensors for obtaining a desired fuel blend from the fuel blending system.

It is another object of the present invention to provide a fuel blending system utilizing proportional flow control valves and corresponding flow meters for obtaining a desired fuel blend from the fuel blending system.

It is a still further object of the present invention to provide a system and method for calibrating the highly accurate positive displacement meter within a fuel dispensing system.

Some of the objects of the invention having been stated hereinabove, other objects will become evident as the description proceeds, when taken in connection with the accompanying drawings as best described hereinbelow.

BEST MODE FOR CARRYING OUT THE INVENTION

It is commonplace to sense fluid flow in a hydraulic fuel dispensing system using sensors and to use a highly reliable positive displacement meter and pulser as a calibration mechanism of the sensors. The present invention provides a novel way of utilizing the sensors to achieve a desired fuel blend.

Figure 1:
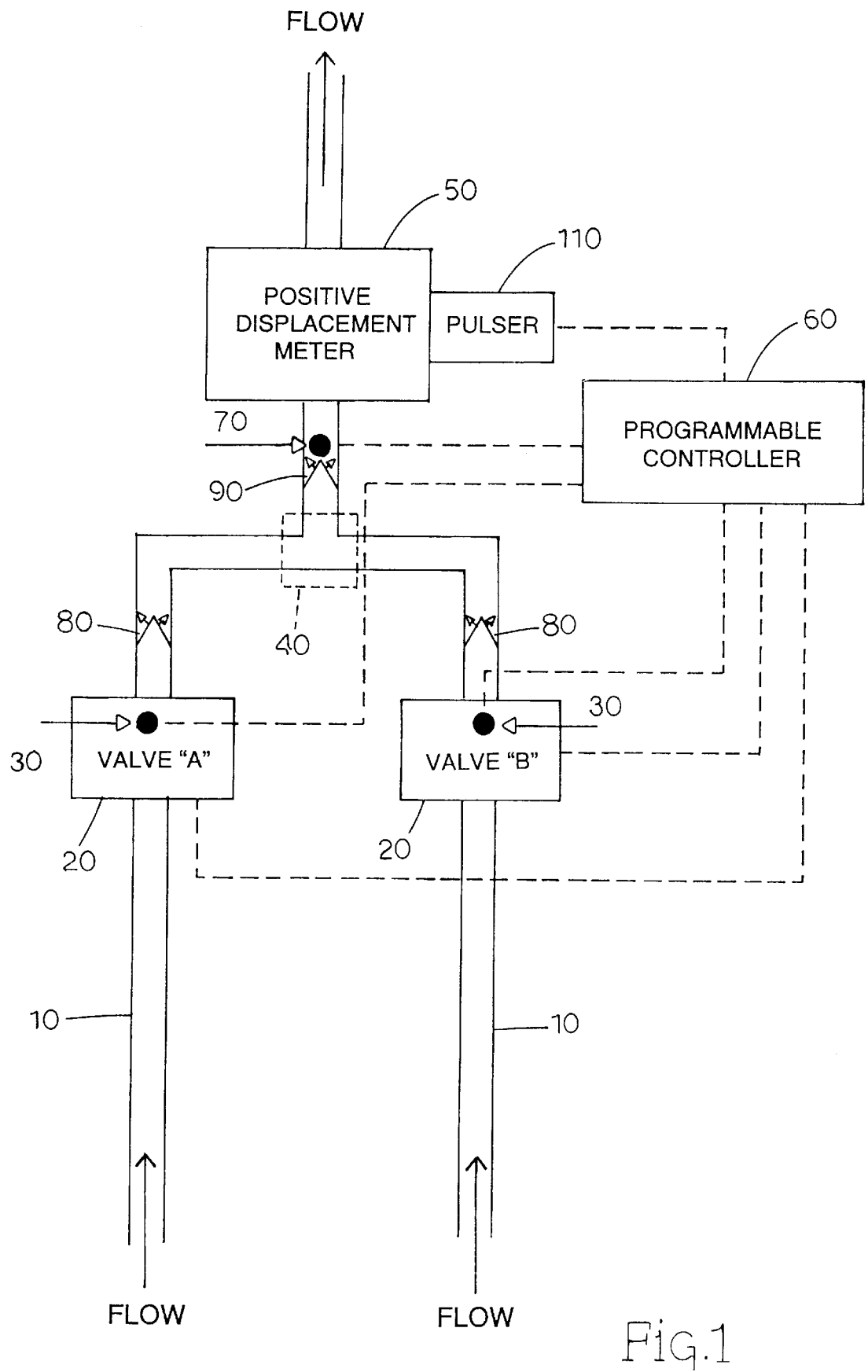
FIG. 1 is a block schematic diagram illustrating the pressure sensor embodiment of the present invention.

A preferred embodiment of the present invention is shown in FIG. 1. The flow path illustrated emanates from two (2) underground fuel storage tanks (not shown) having dissimilar (high and low) octane ratings. Fluid flow inlets 10 feed into a pair of proportional flow control valves 20, each manufactured with a pressure transducer 30. Downstream of the flow control valves 20 is a manifold area 40 where the fuel is actually blended together and fed to a positive displacement meter 50 before being dispensed. The present invention invokes Bernoulli's principle which teaches that a variance in pressure will correlate to a linear change in flow rate.

A computer controller 60 is programmed for a set desired fuel blend and an equivalent ratio in fluid pressure is used to obtain the desired fuel blend. For example, if a 50/50 blend between the two underground tanks is desired, controller 60 is programmed to maintain a 50/50 pressure ratio between each proportional flow control valve 20. A pressure increase in valve "A", for instance, will cause valve "B" to react by permitting an increase in pressure in that valve. If valve "B" is already opened to the maximum limit, then valve "A" is modulated so that its pressure is reduced. Other blend ratios are achieved by programming the controller 60 to maintain the correct pressure ratio between valves.

An additional pressure transducer 70 can be located downstream of manifold area 40 but before positive displacement meter 50. Controller 60 is programmed so that the pressure sensed by pressure transducer 70 is not permitted to exceed the allowed lowest pressure of either of the pressure transducers for a given flowrate. If such a condition is detected, reverse flow through one of the valves is occurring. The valves are then modulated as required in order to obtain the correct blend ratio until the pressure sensed at the transducer 70 is less than the pressure at transducers 30.

A pair of check valves 80 situated between flow control valves 20 and manifold area 40 serve to prevent fluid flow from reversing direction during operation of the fuel dispenser. A check valve is essentially a device that allows fluid to flow in one direction only. A third check valve 90 may be situated between manifold area 40 and positive displacement meter 50 for the purpose of keeping excess fuel which may be left in positive displacement meter 50 from going back down the flow path.

Figure 2:
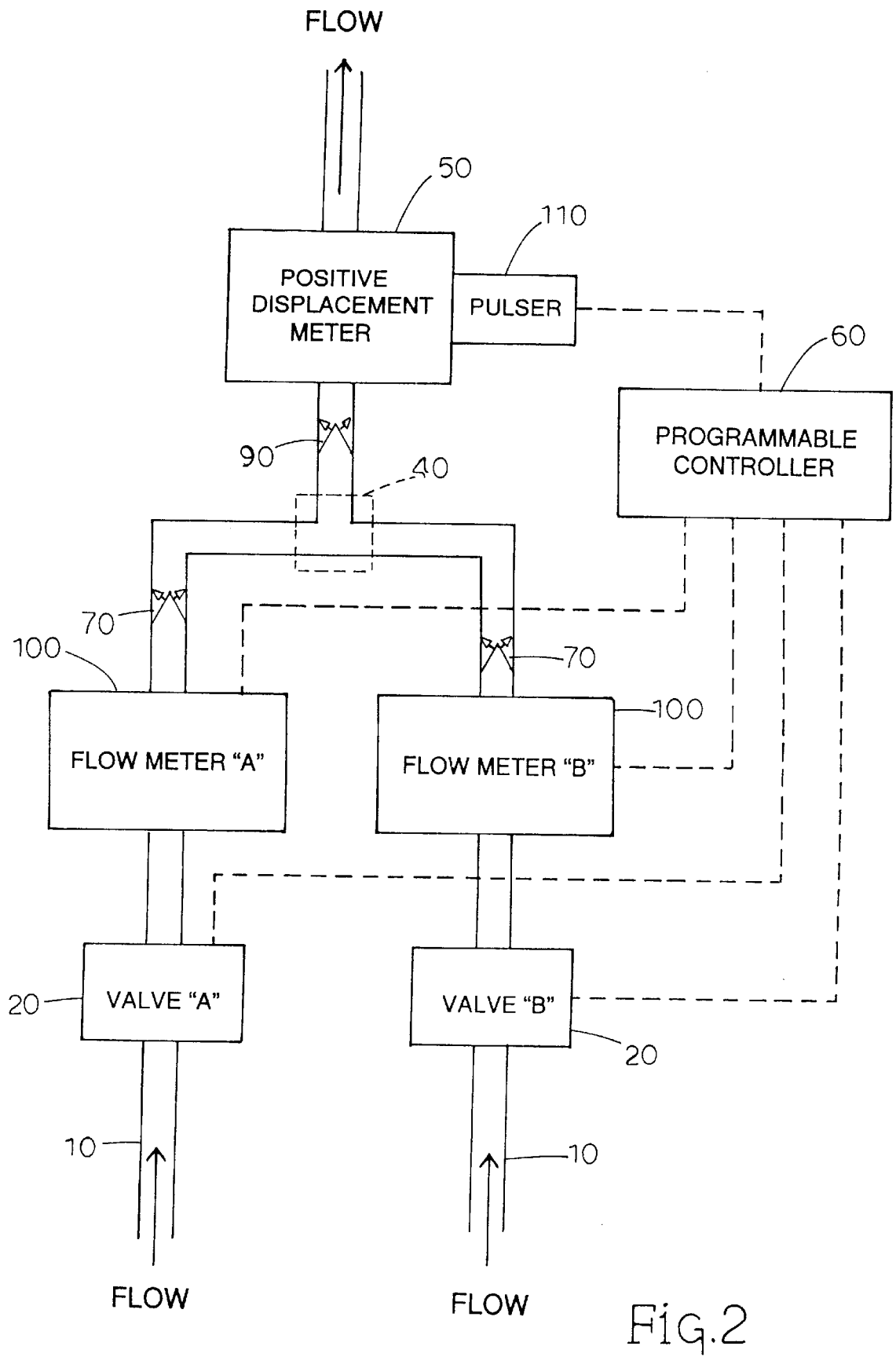
FIG. 2 is a block schematic diagram illustrating the flow meter embodiment of the present invention.

A second embodiment of the present invention is shown in FIG. 2. It uses flow meters 100 in lieu of pressure transducers 30. Flow meters 100 are installed after the proportional flow control valves 20 and are used for measuring fluid flow through each inlet 10. Positive displacement meter 50 and pulser 110 provide the total fluid flow to control the system thus allowing the system to operate in a closed-loop manner. By using flow meters 100 and programmable controller 60, designated blend ratios are achieved by varying product flow through proportional flow control valves 20. If flow meters 100 are also capable of sensing reverse fluid flow, it would allow the control software to shut the valve experiencing reverse flow.

Again, a pair of check valves 80 situated between flow control valves 20 and manifold area 40 serve to prevent fluid flow from reversing direction during operation of the fuel dispenser. A third check valve 90 may be situated between manifold area 40 and positive displacement meter 50 for the purpose of keeping excess fuel which may be left in positive displacement meter 50 from going back down the flow path.

Many types of flow meters are viable for use in the present invention, including, but not limited to, differential pressure, micro-anemometer, venturi, turbine, capacitance, radio frequency (RF), ultrasonic, mass flow, magnetic, and acoustic.

Both embodiments described herein allow the performance of pressure sensors 30 or flow meters 100 to be calibrated against positive displacement meter 50. This is achieved by having controller 60 plot the flow rate as reported by each pressure sensor 30 or flow meter 100 against the flow rate reported by positive displacement meter 50 and pulser 110. (See, FIGS. 3A and 3B, respectively).

The "calibration" process takes place at the factory and in the field. At the factory, the positive displacement meter is calibrated immediately after it is manufactured. The initial calibration is very accurate. Unfortunately, over time, this accuracy can drift due to mechanical wear within the positive displacement meter. The mechanical wear actually changes the internal geometry of the positive displacement meter, so calibration needs to be performed periodically in the field. Both in the field and in the factory, the calibration method requires dispensing five (5) gallons into a "prover can". The prover can has a sight glass built in so the individual performing the calibration obtains a visual indication of whether the tested positive displacement meter is accurate, and if not, how inaccurate it was. The calibrator can then turn an adjustment wheel on the positive displacement meter to correct for any error.

In the U.S., each State has an agency (typically the Department of Commerce or the Department of Agriculture) that verifies the accuracy of the fuel dispensers by using the above method. This is done when the fuel dispensers are first installed at the station and periodically afterwards (typically annually).

The present invention takes advantage of the calibration requirement to determine the accuracy of the flow meters or pressure sensors (depending on which sensing method is used) via the high accuracy positive displacement meter. In normal operation, a blending dispenser draws fuel from two (2) underground tanks, one high octane and one low octane, and combines them in order to achieve a desired octane. The present invention creates an algorithm during field calibration which uses the highly accurate positive displacement meter to determine the accuracy of the flow meters or pressure sensors.

A five (5) gallon preset is performed on the fuel dispenser. During the preset, the controller varies the opening of the valve on one source and uses the positive displacement meter as an absolute reference while measuring the inputs from the flow or pressure sensors. Thus the controller can create a table that correlates the positive displacement meter and the sensors for various flow rates. A "preset", as opposed to a "fill-up", is a fueling process for ensuring the customer receives the intended amount of fuel. The difference between the two processes is that with a fill-up, the customer physically stops the fuel flow by releasing the trigger of the nozzle. In a preset, the dispenser (not the customer) stops the fuel flow after a predetermined volume of fuel has been dispensed.

Thus, a statistical correlation can be determined between the positive displacement meter and the flow meters or pressure sensors for different flow rates. The resulting blending algorithm provides higher accuracy blending by using the resulting correlation curves of FIGS. 3A and 3B.

Figure 3A:
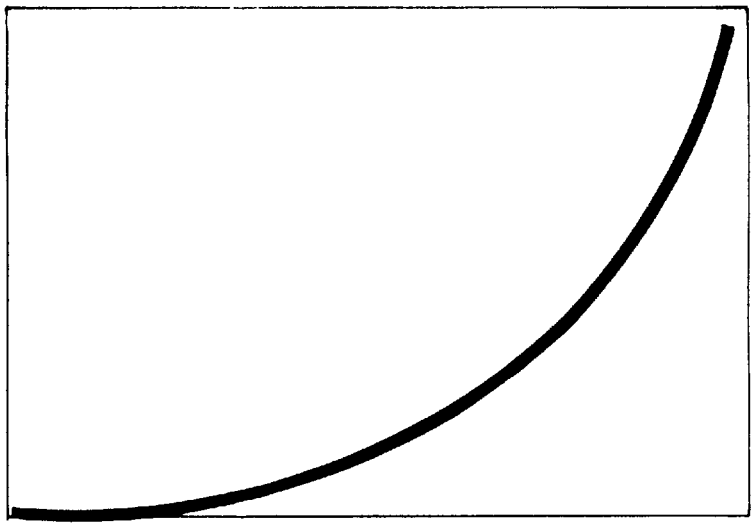
FIGS. 3A and 3B are correlation graphs illustrating potential positive displacement meter wear subsequent to installation and initial calibration of the positive displacement meter.
Figure 3B:
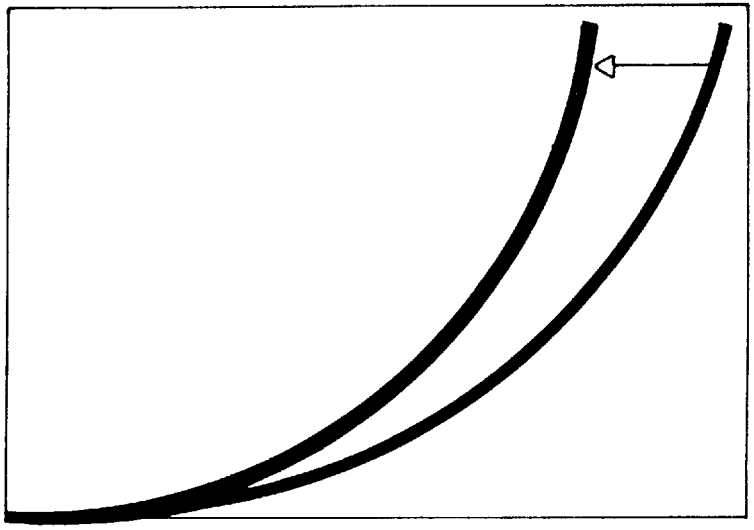

FIG. 3A illustrates the correlation between the positive displacement meter measurement readings and the pressure sensor (or flow meter) measurement readings at the initial calibration. This is when the positive displacement meter is at its most accurate. FIG. 3B illustrates the same measurements taken some time after initial calibration overlaid on the curve of FIG. 3A. The statistical correlation provides the ability to detect positive displacement meter wear, which is indicated by a gradual shift in the curves. Since the fuel dispenser controller "knows" the original baseline curve, it continues to evaluate the correlation between the positive displacement meter and the sensors and compensates for positive displacement meter wear by multiplying the positive displacement meter's flow rate by a constant that reconciles the curves back into agreement. This method is viable because the flow or pressure sensors are not susceptible to wear, like the positive displacement meter.

Finally, the correlation curve of FIG. 3B ensures that the pulser, which is the electrical device that translates the mechanical motion of the positive displacement meter into electrical information, is working properly, and has not been tampered with.

The significance of positive displacement meter wear and its affect on accuracy can be minimized by making adjustments to the ratio of positive displacement meter rotation to pulse output based on early sensor readings for a given flow rate compared to more recent meter readings. Thus, electronic calibration is achieved.

The present invention can utilize any type of electro-mechanical flow control valve, but the preferred type is a solenoid-controlled poppet valve. This design choice is a safety consideration and insures that if power is removed from a fuel dispenser, the pressure of the gasoline in the underground piping will act to close the flow control valve (s).

It will be understood that various details of the invention may be changed without departing from the scope of the invention. Furthermore, the foregoing description is for the purpose of illustration only, and not for the purpose of limitation-the invention being defined by the claims.

What is claimed is:

1. A system for blending two grades of fuel having dissimilar octane ratings into a third intermediate grade of fuel comprising:
   (a) a first flow control valve within a first fuel flow path, for receiving a low octane rated fuel;
   (b) a second flow control valve within a second fuel flow path, for receiving a high octane rated fuel;
   (c) a first pressure transducer within said first fuel flow path proximate to said first flow control valve;
   (d) a second pressure transducer within said second fuel flow path proximate to said second flow control valve;
   (e) a manifold area for combining the low and high octane fuels from the first and second fuel flow paths into a single fuel flow path;
   (f) a meter within the combined single fuel flow path for measuring the amount of fuel to be dispensed;
   (g) a programmable controller coupled to said first and second pressure transducers and said first and second flow control valves, said controller for monitoring and controlling the operation of said first and second flow control valves; and
   (h) a third pressure transducer situated within the combined single fuel flow path for ensuring the pressure of the combined flow does not exceed the pressures of said first and second flow control valves,
   wherein a desired blend of fuel is achieved by proportionally varying said first and second flow control valves.

2. The system of claim 1 wherein when the pressure of the combined flow will imminently exceed the pressures of said first and second flow control valves, the controller restricts the flow of the flow control valve having a higher pressure reading.

3. The system of claim 1 further comprising:
   (a) a first check valve between the first flow control valve and the manifold area for preventing fluid flow from reversing direction; and
   (b) a second check valve between the second flow control valve and the manifold area for preventing fluid flow from reversing direction.

4. The system of claim 3 further comprising a third check valve between the manifold area and the meter for preventing fluid flow from reversing direction.

5. The system of claim 1 wherein the meter is a positive displacement flow meter, differential pressure flow meter, micro-anemometer flow meter, venturi flow meter, turbine flow meter, capacitance flow meter, radio frequency flow meter, ultrasonic flow meter, mass-flow meter, magnetic flow meter, or acoustic flow meter.

6. The system of claim 1 further comprising:
   (a) a first check valve between the first flow control valve and the manifold area for preventing fluid flow from reversing direction;
   (b) a second check valve between the second flow control valve and the manifold area for preventing fluid flow from reversing direction; and
   (c) a third check valve between the manifold area and the meter for preventing fluid flow from reversing direction.

7. The system of claim 6 wherein the meter is a positive displacement flow meter, differential pressure flow meter, micro-anemometer flow meter, venturi flow meter, turbine flow meter, capacitance flow meter, radio frequency flow meter, ultrasonic flow meter, mass-flow meter, magnetic flow meter, or acoustic flow meter.

8. In a fuel dispenser having a single nozzle for dispensing at least three fuel grades, an apparatus for blending two grades of fuel having dissimilar octane ratings into a third intermediate grade of fuel comprising:
   (a) a first flow control valve within a first fuel flow path, for receiving a low octane rated fuel;
   (b) a second flow control valve within a second fuel flow path, for receiving a high octane rated fuel;
   (c) a first pressure transducer within said first fuel flow path proximate to said first flow control valve;
   (d) a second pressure transducer within said second fuel flow path proximate to said second flow control valve;
   (e) a manifold area for combining the low and high octane fuels from the first and second fuel flow paths into a single fuel flow path;
   (f) a meter within the combined single fuel flow path for measuring the amount of fuel to be dispensed; and
   (g) a programmable controller coupled to said first and second pressure transducers and said first and second flow control valves, said controller for monitoring and controlling the operation of said first and second flow control valves,
   wherein at least three grades of fuel are dispensed through said single fuel flow path, said grades are comprised of said low octane rated fuel achieved by opening said first flow control valve and closing said second flow control valve, said high octane rated fuel achieved by opening said second flow control valve and closing said first flow control valve, and a desired blend of fuel achieved by proportionally varying said first and second flow control valves.

9. A system for blending two grades of fuel having dissimilar octane ratings into a third intermediate grade of fuel comprising:
   (a) a first flow control valve within a first fuel flow path, for receiving a low octane rated fuel;
   (b) a second flow control valve within a second fuel flow path, for receiving a high octane rated fuel;
   (c) a first flow meter within said first fuel flow path proximate to said first flow control valve;
   (d) a second flow meter within said second fuel flow path proximate to said second flow control valve;
   (e) a manifold area for combining the low and high octane fuels from the first and second fuel flow paths into a single fuel flow path;

(f) a positive displacement meter within the combined single fuel flow path for measuring the amount of fuel to be dispensed; and (g) a programmable controller coupled to said first and second flow meters and said first and second flow control valves, said controller for monitoring and controlling the operation of said first and second flow control valves, wherein a desired blend of fuel is achieved by proportionally varying the fuel flow through said first and second flow control valves according to the readings of said first and second flow meters.

10. The system of claim 9 wherein said first and second flow meters sense reverse fluid flow and communicate such a condition to said controller which will shut down the flow control valve experiencing the reverse fluid flow.

11. The system of claim 9 further comprising:

(a) a first check valve between the first flow control valve and the manifold area for preventing fluid flow from reversing direction; and (b) a second check valve between the second flow control valve and the manifold area for preventing fluid flow from reversing direction.

12. The system of claim 11 further comprising a third check valve between the manifold area and the meter for preventing fluid flow from reversing direction.

13. The system of claim 9 wherein the meter is a positive displacement flow meter, differential pressure flow meter, micro-anemometer flow meter, venturi flow meter, turbine flow meter, capacitance flow meter, radio frequency flow meter, ultrasonic flow meter, mass-flow meter, magnetic flow meter, or acoustic flow meter.

14. The system of claim 12 wherein the meter is a positive displacement flow meter, differential pressure flow meter, micro-anemometer flow meter, venturi flow meter, turbine flow meter, capacitance flow meter, radio frequency flow meter, ultrasonic flow meter, mass-flow meter, magnetic flow meter, or acoustic flow meter.

15. In a fuel dispenser, an apparatus for blending two grades of fuel having dissimilar octane ratings into a third intermediate grade of fuel comprising:

(a) a first flow control valve within a first fuel flow path, for receiving a low octane rated fuel;

(b) a second flow control valve within a second fuel flow path, for receiving a high octane rated fuel;

(c) a first flow meter within said first fuel flow path proximate to said first flow control valve;

(d) a second flow meter within said second fuel flow path proximate to said second flow control valve;

(e) a manifold area for combining the low and high octane fuels from the first and second fuel flow paths into a single fuel flow path;

(f) a positive displacement meter within the combined single fuel flow path for measuring the amount of fuel to be dispensed; and (g) a programmable controller coupled to said first and second flow meters and said first and second flow control valves, said controller for monitoring and controlling the operation of said first and second flow control valves, wherein a desired blend of fuel is achieved by proportionally varying the fuel flow through said first and second flow control valves according to the readings of said first and second flow meters.

\* \* \* \* \*

UNITED STATES PATENT AND TRADEMARK OFFICE
CERTIFICATE OF CORRECTION

PATENT NO.    : 6,227,227 B1
DATED         : May 8, 2001
INVENTOR(S)   : Edward S. Poleshuk and Joseph D. Long It is certified that error appears in the above-identified patent and that said Letters Patent is hereby corrected as shown below:

<u>Title page,</u>
Item [73], Assignee, should read -- Marconi Commerce Systems Inc. --

Signed and Sealed this

Twenty-first Day of January, 2003

JAMES E. ROGAN
*Director of the United States Patent and Trademark Office*